(12) United States Patent
Klais

(10) Patent No.: US 6,446,991 B1
(45) Date of Patent: Sep. 10, 2002

(54) LOWER CONTROL ARM ADJUSTMENT SYSTEM

(75) Inventor: Matthew E Klais, Waterford, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/725,989

(22) Filed: Nov. 29, 2000

(51) Int. Cl.$^7$ ............................................ B62D 17/00
(52) U.S. Cl. ........................ 280/86.75; 280/124.134
(58) Field of Search ................... 280/86.75, 86.751, 280/86.752, 86.753, 86.755, 86.757, 124.134, 124.135, 124.136, 124.137, 5.52, 5.521

(56) References Cited

U.S. PATENT DOCUMENTS

| | | |
|---|---|---|
| 2,263,628 A | 11/1941 | Hinton |
| 2,855,212 A | 10/1958 | Houser |
| 3,124,370 A | 3/1964 | Traugott |
| 4,030,737 A * | 6/1977 | Bridges .................. 280/86.75 |
| 4,267,896 A * | 5/1981 | Hendriksen .............. 280/86.75 |
| 4,313,617 A | 2/1982 | Muramatsu et al. |
| 4,616,845 A | 10/1986 | Pettibone |
| 4,635,958 A | 1/1987 | Yonemoto |
| 4,733,884 A * | 3/1988 | Pettibone et al. ...... 280/86.753 |
| 4,736,964 A | 4/1988 | Specktor |
| 4,754,991 A | 7/1988 | Jordan |
| 4,869,527 A | 9/1989 | Coddens |
| 4,973,075 A | 11/1990 | Rori et al. |
| 5,052,711 A | 10/1991 | Pirkey et al. |
| 5,284,353 A | 2/1994 | Shinji et al. |
| 5,286,052 A | 2/1994 | Lukianov |
| 5,301,977 A | 4/1994 | Schlosser et al. |
| 5,332,255 A | 7/1994 | Velazquez |
| 5,398,411 A * | 3/1995 | Kusaka et al. ............. 29/897.2 |
| 5,775,719 A | 7/1998 | Holden |
| 5,826,894 A | 10/1998 | McDonald et al. |
| 5,839,742 A | 11/1998 | Holt |
| 5,967,536 A | 10/1999 | Spivey et al. |
| 6,003,886 A | 12/1999 | Kiesel |

* cited by examiner

Primary Examiner—Paul N. Dickson
Assistant Examiner—David R. Dunn
(74) Attorney, Agent, or Firm—Ralph E. Smith

(57) ABSTRACT

A lower control arm adjustment system for an automobile suspension system is described. The system primarily includes a substantially U-shaped bracket member selectively fastened to a lower control arm member with a cam bolt, wherein when the cam bolt is moved in a first direction, the lower control arm member moves to a first position, and when the cam bolt is moved in a second direction, the lower control arm member moves to a second position. In this manner, the lower control arm member can be moved inboard/outboard with respect to the automobile body.

17 Claims, 2 Drawing Sheets

LOWER CONTROL ARM ADJUSTMENT SYSTEM

BACKGROUND OF THE INVENTION

Field of the Invention

The present invention relates generally to automobile suspension systems, and more particularly to a lower control arm adjustment system for an automobile.

BACKGROUND AND SUMMARY OF THE INVENTION

If a vehicle's axles were bolted directly to its frame or body, every rough spot in the road would transmit a jarring force throughout the vehicle. Riding would be uncomfortable, and handling at freeway speeds would be impossible. The fact that the modern vehicle rides and handles well is a direct result of a suspension system.

Even though the tires and wheels must follow the road contour, the body should be influenced as little as possible. The purpose of any suspension system is to allow the vehicle to travel forward with a minimum amount of up-and-down movement. The suspension should also permit the vehicle to make turns without excessive body roll or tire skidding.

As part of a conventional suspension system, all vehicles have either control arms or struts to keep the wheel assembly in the proper position. The control arms (i.e., upper and lower) and struts allow the wheel to move up and down while preventing it from moving in any other direction. The wheel will tend to move in undesirable directions whenever the vehicle is accelerated, braked, or turned. Vehicle suspensions may have control arms only or a combination of control arms and struts.

Typically, control arms are generally configured in a V-shape design with a pair of pivot arms (i.e., front and rear attachment points) pivotally mounted to a surface of the vehicle frame with brackets and associated bushings, with the apex of the control arm being mounted to the spindle via a ball joint, or like assembly. The front and rear attachment points pivot on the rubber bushings. The attachment points absorb the tendency of the control arm to move forward and rearward as the wheel moves. The control arm design keeps the wheel from moving inward and outward.

By designing the upper and lower control arms carefully, it is possible to have a suspension system that allows the wheel to move up and down while causing it to remain in the straight up and down position. The upper and lower control arms move through different arcs, keeping the outer pivot points in alignment. This improves handling over bumps.

Accordingly, it is necessary to ensure that the pivot points remain in proper alignment or else the suspension system performance can be compromised. Typically, the alignment is accomplished through adjusting the position of the control arm relative to its respective bracket.

A more complete description of suspension systems in general, and adjustment systems for the various components of suspension systems in particular, can be found in the following U.S. patents, the entire disclosures of which are incorporated herein by reference:

U.S. Pat. No. 2,855,212 to Houser discloses independently suspending the axles of a vehicle on rubber torsion springs while providing for independent adjustment of the spring means.

U.S. Pat. No. 3,124,370 to Traugott discloses automotive vehicles of the type wherein the front wheels are independently suspended from the vehicle frame, these types of assemblies generally employing upper and lower control arms, which are pivotally connected at their inner ends to the vehicle frame, the outer ends of the control arms supporting the wheel spindle assembly.

U.S. Pat. No. 4,616,845 to Pettibone discloses a toe adjustment assembly for adjusting the toe in the rear wheels of a vehicle having an independent rear suspension including: a cam device operatively associated with a lateral control arm, a slot provided in fixed relationship with the vehicle frame, and, cam engaging surfaces associated with the slot.

U.S. Pat. No. 4,736,964 Specktor discloses an apparatus for guarding against accidental displacement of two members of an automotive vehicle, after an adjustment of an alignment characteristic has been made, involving the use of cams which are used to adjust the alignment characteristic and which have prongs which are pressed into the adjacent surfaces of a member of the suspension system.

U.S. Pat. No. 4,754,991 to Jordan discloses a method and buffer apparatus for preventing corrosion in a dynamic load bearing assembly.

U.S. Pat. No. 4,869,527 to Coddens discloses a vehicle wheel alignment device for adjusting the camber of a wheel carried at one end of a lateral suspension member, such as an I-beam of a twin I-beam suspension.

U.S. Pat. No. 5,052,711 to Pirkey et al. discloses a method and apparatus for factory pre-aligning vehicle wheels and for subsequently realigning the vehicle wheels after usage and for verifying such re-alignment.

U.S. Pat. No. 5,284,353 to Shinji et al. discloses an independent suspension for use in a front wheel or a rear wheel of an automobile.

U.S. Pat. No. 5,286,052 to Lukianov discloses a double wishbone suspension system for a motor vehicle which achieves reduced roll center movement and wheel camber change relative to the vehicle body in jounce and rebound of the vehicle wheels throughout their suspension travel while requiring minimal packaging space.

U.S. Pat. No. 5,301,977 to Schlosser et al. discloses an adjustment system for providing toe and/or camber adjustment for a normally fixed wheel of a vehicle using a plate member, in conjunction with portions of the structures of the suspension system of the vehicle, to locate at least one center point for the formation of new aligned openings so that a portion of the control system may be moved from an original location and secured at a new location to provide for the toe and/or camber adjustment.

U.S. Pat. No. 5,332,255 to Velazquez discloses a heavy duty front suspension system especially for passenger buses includes square rubber torque springs supported by a spring frame assembly.

U.S. Pat. No. 5,775,719 to Holden discloses a control arm adjustment mechanism including a frame bracket connected to a vehicle frame with a bolt extending through the frame bracket.

U.S. Pat. No. 5,826,894 to McDonald et al. discloses a toe adjustment assembly including a frame and a pair of lateral links pivotally mounted to the frame. A bore is formed in at least one of the links.

U.S. Pat. No. 5,839,742 to Holt discloses a suspension system with a contained force system which concentrates loads in the suspension geometry control elements.

U.S. Pat. No. 5,967,536 to Spivey et al. discloses a system and method for converting stock MacPherson strut suspension systems for a host automobile to a double A-arm type of suspension system using only stock or pre-existing mounting locations and only ordinary hand tools.

U.S. Pat. No. 6,003,886 to Kiesel discloses a rear lateral arm for lowering the body of a vehicle which includes a mechanism which can be adjusted to compensate for the excessive negative camber associated with such lowering.

Although conventional adjustment systems have aided somewhat in facilitating the adjustment of lower control arms in general, they have several disadvantages. Initially, the packaging area for these types of systems is relatively large. Second, their installation is rather labor-intensive, thus increasing manufacturing costs as well as the chances for defects, such as weld failures and misalignment. Third, these systems are rather complex to understand and master, and therefore, the potential for operator error in significant.

Therefore, there exists a need for a lower control arm adjustment system that is inexpensive to manufacture, simple to operate, and is easily integrated into the vehicle's suspension system.

Accordingly, at least one of the objects of the present invention is to provide such a lower control arm adjustment system.

In accordance with one embodiment of the present invention, a lower control arm adjustment system for an automobile suspension system is provided, comprising:
- a lower control arm member, the lower control arm member having a substantially U-shaped member formed on a surface thereof, the U-shaped member having an area defining an aperture formed therein;
- a substantially U-shaped bracket member having a first aperture and a second aperture formed therein, the bracket member being received in the U-shaped member of the lower control arm so as to align the aperture of the bracket member with the aperture of the U-shaped member of the lower control arm member;
- a bushing member having an aperture formed therein, the bushing member being received in the bracket member so as to align the second aperture of the bracket member with the aperture of the bushing member; and
- a position adjustment member rotatably received in the aperture of the bracket member and the aperture of the U-shaped member of the lower control arm member;
- wherein when the position adjustment member is rotated in a first direction, the lower control arm member moves in one of an inboard and outboard direction relative to the bushing member;
- wherein when the position adjustment member is rotated in a second direction, the lower control arm member moves in the other of the inboard and outboard direction relative to the bushing member.

In accordance with a first alternative embodiment of the present invention, a lower control arm adjustment system for an automobile suspension system is provided, comprising:
- a lower control arm member, the lower control arm member having a substantially U-shaped member formed on a surface thereof, the U-shaped member having an area defining an aperture formed therein;
- a substantially U-shaped bracket member having a first area defining a first aperture formed therein and a second area having a second aperture formed therein, the bracket member being received in the U-shaped member of the lower control arm so as to align the first aperture of the bracket member with the aperture of the U-shaped member of the lower control arm member;
- a bushing member having an area defining an aperture formed therein, the bushing member being received in the bracket member so as to align the second aperture of the bracket member with the aperture of the bushing member; and
- a position adjustment member rotatably received in the aperture of the bracket member and the aperture of the U-shaped member of the lower control arm member;
- wherein when the position adjustment member is moved in a first direction, the lower control arm member moves to a first position relative to the bushing member;
- wherein when the position adjustment member is moved in a second direction, the lower control arm member moves to a second position relative to the bushing member.

In accordance with a second alternative embodiment of the present invention, a lower control arm adjustment system for an automobile suspension system is provided, comprising:
- a lower control arm member, the lower control arm member having a substantially U-shaped member formed on a surface thereof, the U-shaped member having an area defining an aperture formed therein;
- a substantially U-shaped bracket member having a first area defining a first aperture formed therein and a second area having a second aperture formed therein, the bracket member being received in the U-shaped member of the lower control arm so as to align the first aperture of the bracket member with the aperture of the U-shaped member of the lower control arm member;
- a bushing member having an area defining an aperture formed therein, the bushing member being received in the bracket member so as to align the second aperture of the bracket member with the aperture of the bushing member;
- a torsion control assembly received in the aperture of the bushing member; and
- a position adjustment member rotatably received in the aperture of the bracket member and the aperture of the U-shaped member of the lower control arm member;
- wherein when the position adjustment member is moved in a first direction, the lower control arm member moves to a first position relative to bushing member;
- wherein when the position adjustment member is moved in a second direction, the lower control arm member moves to a second position relative to bushing member.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from the detailed description.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

Although the present invention is directed primarily to a lower control arm adjustment system, it should be noted that the present invention can be practiced with any number of different types of mechanisms and assemblies which require the adjustment of pivot points and relative positions.

Figure 1:
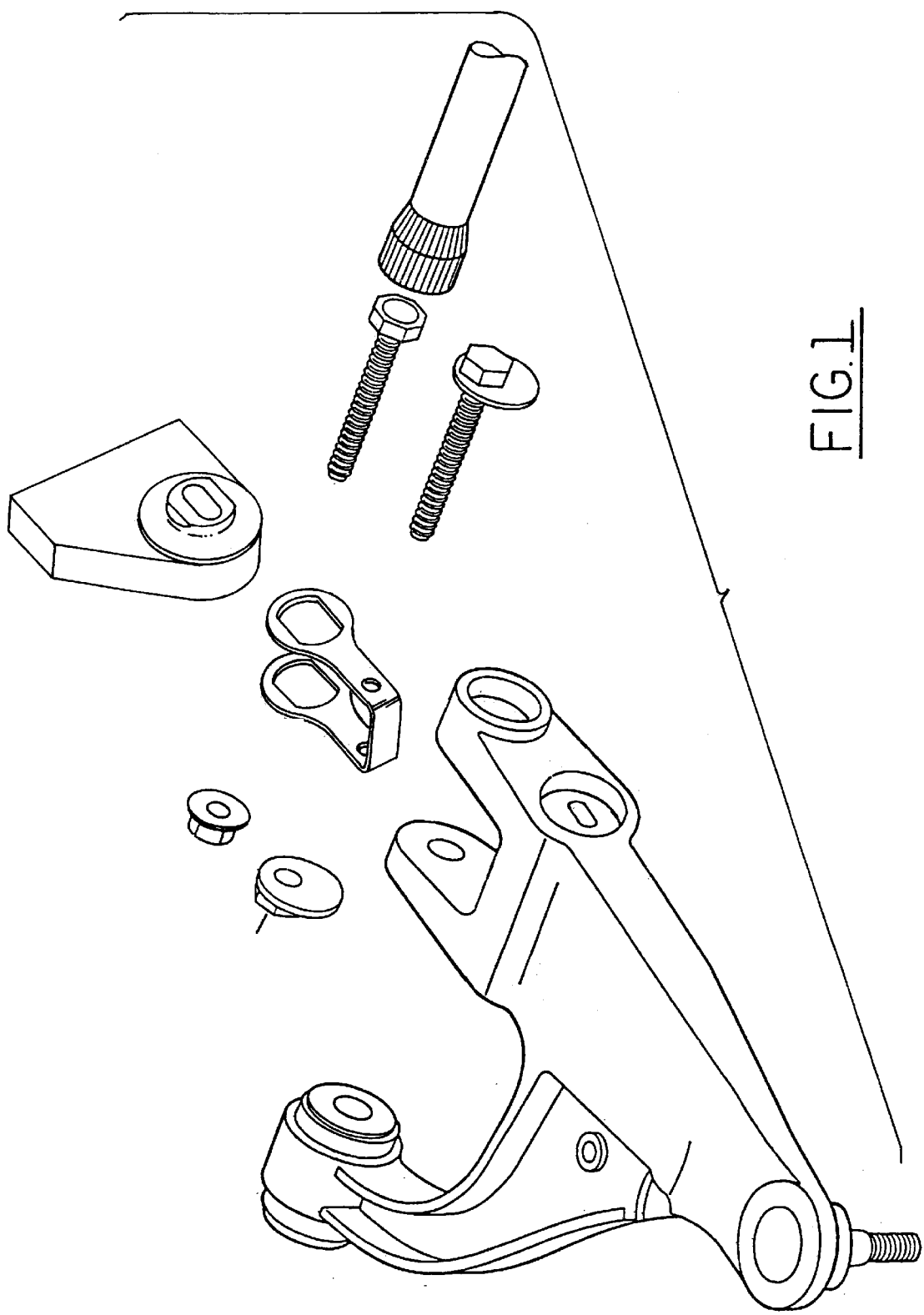
FIG. 1 is an exploded view of a lower control arm adjustment system, in accordance with one embodiment of the present invention.

Referring to FIG. 1, there is shown a lower control arm adjustment system 10, in accordance with one embodiment of the present invention. The system 10 includes a substantially U-shaped bracket member 12 having a first set of apertures 14 and 16 and a second set of apertures 18 and 20. A bushing member 22 is intended to be tightly received in the open end of the bracket 12, as shown to form a bracket 12/bushing 22 subassembly. The bushing 22 preferably includes a slot 24 that aligns with apertures 18 and 20 once bushing 22 is seated in bracket 12.

The bracket 12/bushing 22 subassembly is intended to be received within a recess 26 formed in a substantially U-shaped member 28 formed on the surface of a lower control arm member 30. The member 28 preferably includes a first set of slots or apertures 32 and 34 and a second set of slots or apertures 36 and 38. Accordingly, when the bracket 12/bushing 22 subassembly is properly seated within the recess 26, apertures 14 and 16 align with apertures 36 and 38, respectively, and apertures 18, 20, and slot 24 align with apertures 32 and 34, respectively.

Once the bracket 12/bushing 22 subassembly is properly seated within the recess 26, a carriage bolt 40 may be used to selectively secure the bracket 12/bushing 22 subassembly to the lower control arm 30. The carriage bolt 40 is secured in place by a securing mechanism, such as a lock nut 42, which is fastened about the bolt portion 44. A torsion bar 46 may then be selectively secured to the head portion 48.

Additionally, a cam bolt 50 may also be used to selectively secure the bracket 12/bushing 22 subassembly to the lower control arm 30. The cam bolt 50 is secured in place by a securing mechanism, such as a cam washer 52 and a lock nut 54, which are fastened about the bolt portion 56. The head portion 48 is preferably disposed within a sleeve or recess 60 formed in proximity to aperture 36.

Figure 2:
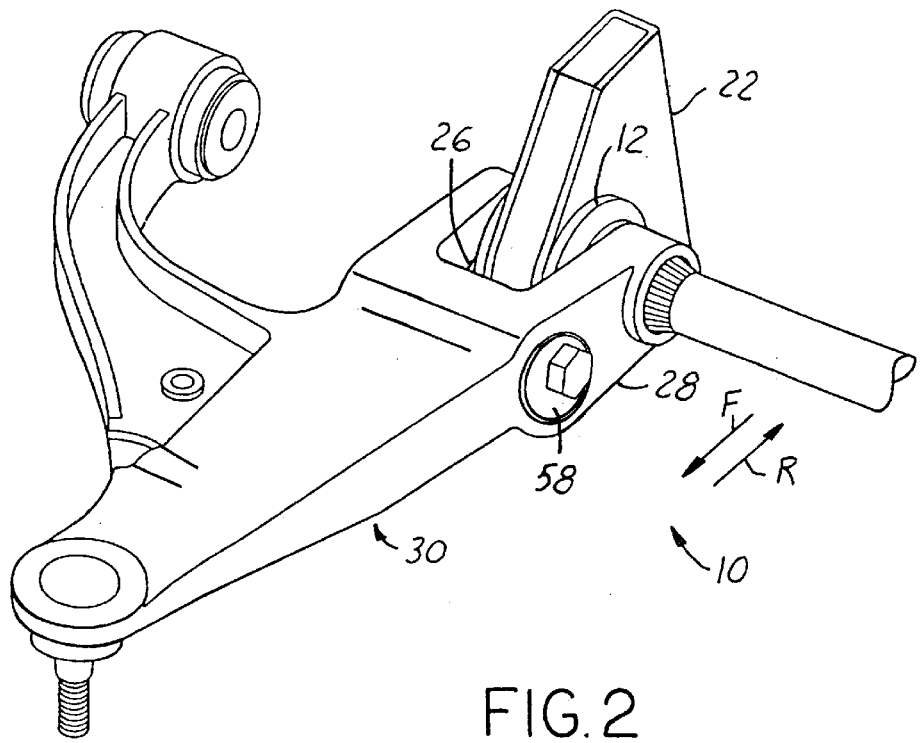
FIG. 2 is a front perspective view of the lower control arm adjustment system depicted in FIG. 1 in a fully assembled state, in accordance with one embodiment of the present invention.

Referring to FIG. 2, there is shown a front perspective view of the lower control arm adjustment system depicted in FIG. 1 in a fully assembled state, in accordance with one embodiment of the present invention. In operation, when the head portion 58 of the cam bolt 50 is rotated in a first direction, the bolt portion 56 moves relative to the aperture 36, thus causing the lower control arm 30 to move outboard in the direction of arrow F or inboard in the direction of arrow R.

Figure 3:
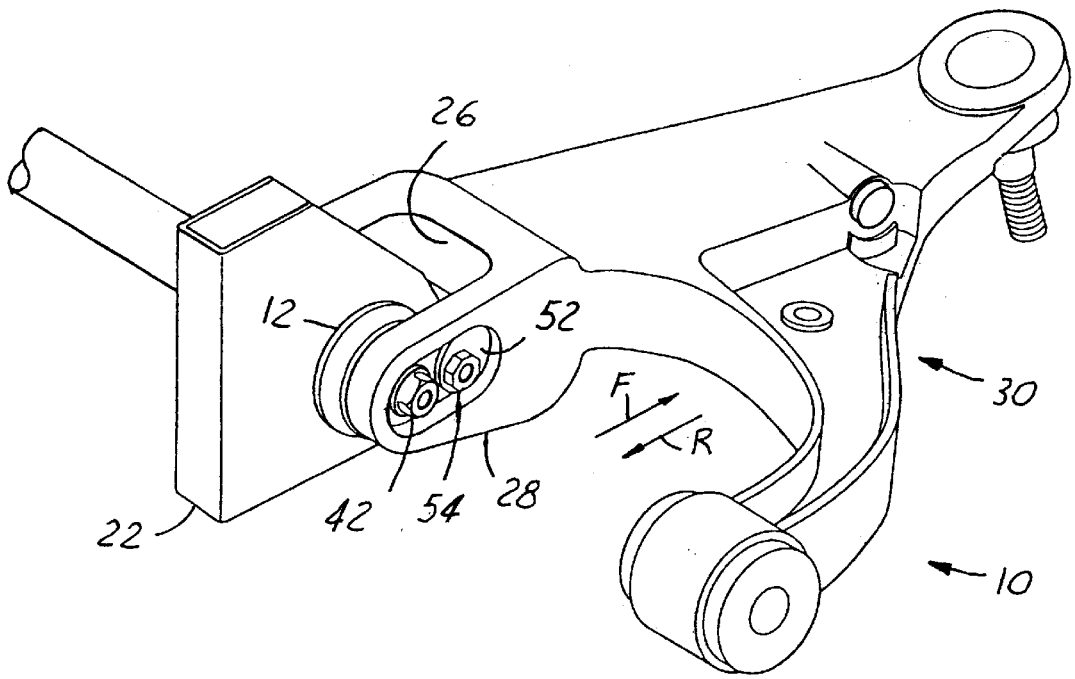
FIG. 3 is a rear perspective view of the lower control arm adjustment system depicted in FIG. 1 in a fully assembled state, in accordance with one embodiment of the present invention.

Referring to FIG. 3, there is shown a rear perspective view of the lower control arm adjustment system depicted in FIG. 1 in a fully assembled state, in accordance with one embodiment of the present invention. Again, in operation, when the head portion 58 of the cam bolt 50 is rotated in a first direction, the bolt portion 56 moves relative to the aperture 36, thus causing the lower control arm 30 to move outboard in the direction of arrow F or inboard in the direction of arrow R.

In order to accomplish the afore-mentioned adjustment procedures, it is generally necessary to first loosen the cam bolt 50, and then loosen the carriage bolt 40. Then, as the cam bolt 50 is turned or rotated, via head portion 58, the lower control arm 30 is pulled either inboard or outboard via the bracket member 12, specifically aperture 36.

When the adjustment procedure is concluded, the carriage bolt 40 and the cam bolt 50 are then tightened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lower control arm adjustment system for an automobile suspension system, comprising:

a lower control arm member, the lower control arm member having a substantially U-shaped member formed on a surface thereof, the U-shaped member having an area defining an aperture formed therein;

a substantially U-shaped bracket member having a first aperture and a second aperture, the bracket member being received in the U-shaped member of the lower control arm so as to align the aperture of the bracket member with the aperture of the U-shaped member of the lower control arm member;

a bushing member having an aperture formed therein, the bushing member being received in the bracket member so as to align the second aperture of the bracket member with the aperture of the bushing member; and a position adjustment member rotatably received in the aperture of the bracket member and the aperture of the U-shaped member of the lower control arm member;

wherein when the position adjustment member is rotated in a first direction, the lower control arm member moves in one of an inboard and outboard direction relative to the bushing member;

wherein when the position adjustment member is rotated in a second direction, the lower control arm member moves in the other of the inboard and outboard direction relative to the bushing member.

2. The invention according to claim 1, wherein the position adjustment member comprises a cam mechanism.

3. The invention according to claim 1, wherein the position adjustment member comprises an elongated cam bolt.

4. The invention according to claim 1, further comprising a mechanism for selectively fastening the position adjustment member to the bracket member.

5. The invention according to claim 1, further comprising a torsion control assembly received in the aperture of the bushing member.

6. The invention according to claim 5, further comprising a mechanism for selectively fastening the torsion control assembly to the bracket member and the bushing member.

7. A lower control arm adjustment system for an automobile suspension system, comprising:

a lower control arm member, the lower control arm member having a substantially U-shaped member formed on a surface thereof, the U-shaped member having an area defining an aperture formed therein;

a substantially U-shaped bracket member having a first area defining a first aperture formed therein and a second area having a second aperture formed therein, the bracket member being received in the U-shaped member of the lower control arm so as to align the first aperture of the bracket member with the aperture of the U-shaped member of the lower control arm member;

a bushing member having an area defining an aperture formed therein, the bushing member being received in the bracket member so as to align the second aperture of the bracket member with the aperture of the bushing member; and a position adjustment member rotatably received in the aperture of the bracket member and the aperture of the U-shaped member of the lower control arm member;

wherein when the position adjustment member is rotated in a first direction, the lower control arm member moves in one of an inboard and outboard direction relative to the bushing member;

wherein when the position adjustment member is rotated in a second direction, the lower control arm member moves in the other of the inboard and outboard direction relative to bushing member.

8. The invention according to claim 7, wherein the position adjustment member comprises a cam mechanism.

9. The invention according to claim 7, wherein the position adjustment member comprises an elongated cam bolt.

10. The invention according to claim 7, further comprising a mechanism for selectively fastening the position adjustment member to the bracket member.

11. The invention according to claim 7, further comprising a torsion control assembly received in the aperture of the bushing member.

12. The invention according to claim 11, further comprising a mechanism for selectively fastening the torsion control assembly to the bracket member and the bushing member.

13. A lower control arm adjustment system for an automobile suspension system, comprising:

a lower control arm member, the lower control arm member having a substantially U-shaped member formed on a surface thereof, the U-shaped member having an area defining an aperture formed therein;

a substantially U-shaped bracket member having a first area defining a first aperture formed therein and a second area having a second aperture formed therein, the bracket member being received in the U-shaped member of the lower control arm so as to align the first aperture of the bracket member with the aperture of the U-shaped member of the lower control arm member;

a bushing member having an area defining an aperture formed therein, the bushing member being received in the bracket member so as to align the second aperture of the bracket member with the aperture of the bushing member;

a torsion control assembly received in the aperture of the bushing member; and a position adjustment member rotatably received in the aperture of the bracket member and the aperture of the U-shaped member of the lower control arm member;

wherein when the position adjustment member is rotated in a first direction, the lower control arm member moves in one of an inboard and outboard direction relative to the bushing member;

wherein when the position adjustment member is rotated in a second direction, the lower control arm member moves in the other of the inboard and outboard direction relative to the bushing member.

14. The invention according to claim 13, wherein the position adjustment member comprises a cam mechanism.

15. The invention according to claim 13, wherein the position adjustment member comprises an elongated cam bolt.

16. The invention according to claim 13, further comprising a mechanism for selectively fastening the position adjustment member to the bracket member.

17. The invention according to claim 13, further comprising a mechanism for selectively fastening the torsion control assembly to the bracket member and the bushing member.

* * * * *